United States Patent
Weinberg et al.

(10) Patent No.: US 12,286,679 B2
(45) Date of Patent: Apr. 29, 2025

(54) METHOD FOR THE DIRECT REDUCTION OF IRON ORE

(71) Applicant: ThyssenKrupp Steel Europe AG, Duisburg (DE)

(72) Inventors: Matthias Weinberg, Krefeld (DE); Daniel Schubert, Duisburg (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 410 days.

(21) Appl. No.: 17/775,419

(22) PCT Filed: Nov. 5, 2020

(86) PCT No.: PCT/EP2020/081153
§ 371 (c)(1),
(2) Date: May 9, 2022

(87) PCT Pub. No.: WO2021/094195
PCT Pub. Date: May 20, 2021

(65) Prior Publication Data
US 2022/0389528 A1 Dec. 8, 2022

(30) Foreign Application Priority Data
Nov. 15, 2019 (DE) .......................... 102019217631.3

(51) Int. Cl.
*C21B 13/00* (2006.01)
*C21B 13/02* (2006.01)

(52) U.S. Cl.
CPC ...... *C21B 13/0033* (2013.01); *C21B 13/0073* (2013.01); *C21B 13/029* (2017.05)

(58) Field of Classification Search
CPC ............ C21B 13/0033; C21B 13/0073; C21B 13/029; C21B 13/00; C21B 13/02;
(Continued)

(56) References Cited

U.S. PATENT DOCUMENTS 4,224,057 A * 9/1980 Martinez-Vera ...... C21B 13/029
75/496
4,246,024 A 1/1981 Price-Falcon et al.
(Continued)

FOREIGN PATENT DOCUMENTS

| AT | 503593 | 4/2011 |
| CH | 619736 | 10/1980 |

(Continued)

OTHER PUBLICATIONS

International Search Report and Written Opinion for International Application No. PCT/EP2020/081153 mailed Jan. 28, 2021.
(Continued)

*Primary Examiner* — Jonathan Johnson
*Assistant Examiner* — Maxwell Xavier Duffy
(74) *Attorney, Agent, or Firm* — RMCK Law Group PLC

(57) ABSTRACT

The invention relates to a process for direct reduction of iron ore to afford direct reduced iron, wherein the iron ore sequentially passes through a reduction zone for reducing the iron ore to direct reduced iron and a cooling zone for cooling the direct reduced iron, wherein in the reduction zone the iron ore is subjected to a flow of a reduction gas and wherein in the cooling zone the direct reduced iron is subjected to a flow of a cooling gas. The cooling gas in the cooling zone comprises H2 and CO2, wherein the ratio of the mole fractions of H2 to CO2 is greater than 1.8 and the mole fraction of CO2 is greater than 20 mol %.

14 Claims, 2 Drawing Sheets

(58) Field of Classification Search
CPC ..... C21B 13/006; C21B 13/004; C21B 13/14; C21B 13/146; C01B 32/50; C01B 3/00; Y02P 10/134; Y02P 20/151; Y02P 10/10; Y02P 10/20; Y02P 10/143; C22B 5/12
See application file for complete search history.

(56) References Cited

U.S. PATENT DOCUMENTS

| | | |
|---|---|---|
| 5,437,708 A | 8/1995 | Meissner et al. |
| 6,599,374 B1 * | 7/2003 | Hirsch ................ C21B 13/0086 75/448 |

FOREIGN PATENT DOCUMENTS

| | | | |
|---|---|---|---|
| DE | 2622349 A1 | 11/1976 | |
| DE | 3317701 A1 | 11/1984 | |
| DE | 3709072 A1 | 9/1987 | |
| DE | 69130463 | 7/1999 | |
| WO | WO-2017121978 A1 * | 7/2017 | .......... B01J 19/0006 |

OTHER PUBLICATIONS

Prior Art page from German Office Action for DE Application No. DE102019217631.3.

* cited by examiner

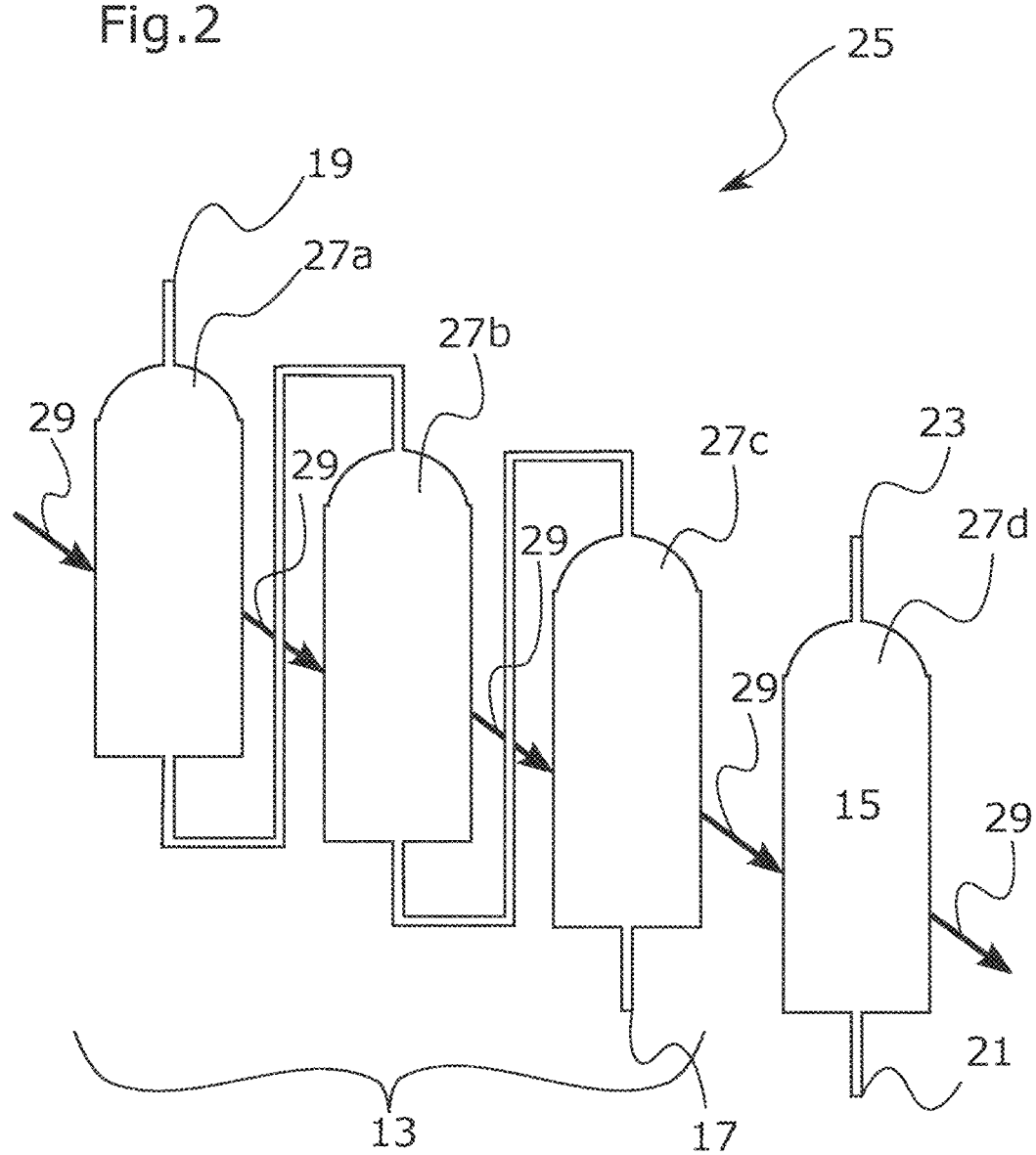

METHOD FOR THE DIRECT REDUCTION OF IRON ORE

CROSS-REFERENCE TO RELATED APPLICATIONS

This application is a 371 U.S. National Stage of International Application No. PCT/EP2020/081153, filed Nov. 5, 2020, which claims the benefit of German Patent Application No. 10 2019 217 631.3 filed Nov. 15, 2019. The disclosures of each of the above applications are incorporated herein by reference in their entirety.

The invention relates to a process for direct reduction of iron ore to afford direct reduced iron. The invention further relates to a cooling gas for use in such a process.

In a direct reduction solid sponge iron (DRI—direct reduced iron ( ) is produced from iron ore by removal of the oxygen. The production of direct reduced iron broadly comprises two fundamental steps. A first step comprises performing the reduction of the iron ore to afford direct reduced iron, also called sponge iron, in a reduction zone with a suitable hot reduction gas. A reduction gas typically comprises essentially CO (carbon monoxide) and H2 (hydrogen) at temperatures in the range from 850° C. to 1100° C. A second step comprises cooling the direct reduced iron produced to temperatures typically below 100° C. in a cooling zone using a cooling gas.

Such a process is known for example from U.S. Pat. No. 4,224,057. U.S. Pat. No. 4,224,057 further discloses that the carbon content of the direct reduced iron can be increased through suitable selection of the gas compositions of cooling gas and reduction gas. Employed both as cooling gas and as reduction gas are gases containing a significant proportion of hydrocarbons (for example methane). The processes described further produce CO2 (carbon dioxide) as a by-product. However, CO2 is a greenhouse gas with known environmentally harmful properties.

It is an object of the present invention to develop this process such that the carbon content of the direct reduced iron produced may be adjusted while simultaneously reducing the production of CO2.

This object is achieved by a process for direct reduction of iron ore to afford direct reduced iron, wherein the iron ore sequentially passes through a reduction zone for reducing the iron ore to direct reduced iron and a cooling zone for cooling the direct reduced iron. In the reduction zone the iron ore is subjected to a flow of a reduction gas and in the cooling zone the direct reduced iron is subjected to a flow of a cooling gas. The cooling gas in the cooling zone comprises H2 and CO2, wherein the ratio of the mole fractions of H2 to CO2 is greater than 1.8 and the mole fraction of CO2 is greater than 20 mol %.

It has been found that, surprisingly, the carbon content of the direct reduced iron can be increased in the cooling zone (also referred to as carburizing the direct reduced iron) by using as the cooling gas a mixture of H2 and CO2 having the described mixing ratio. The so-called Bosch reaction then takes place in the cooling zone:

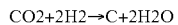

Not only is CO2 not produced, but CO2 is actually consumed in the carburizing of the direct reduced iron. The yield of the reaction is particularly good when the ratio of the mole fractions of H2 to CO2 is greater than 1.8, preferably greater than 1.9. The ratio is especially less than 2.2, preferably less than 2.1. In a particularly preferred variant the ratio of the mole fractions is equal to 2. Furthermore, the mole fraction of CO2 is preferably greater than 20 mol %, in particular greater than 25 mol %, particularly preferably greater than 30 mol %. The mole fraction of CO2 is especially less than 40 mol %, preferably less than 35 mol %.

In a preferred embodiment of the process the cooling gas in the cooling zone comprises less than 5 mol % of hydrocarbons, in particular less than 2 mol % of hydrocarbons. Since the hydrocarbons in the prior art generally derive from fossil fuels (for example natural gas or coke oven gas) the reduction of hydrocarbons is accompanied by a reduction in consumption of fossil fuels. The process is therefore particularly environmentally friendly since it not only consumes CO2 but also reduces the use of fossil fuels.

Upon entering the cooling zone the direct reduced iron preferably has a temperature in the range from 400° C. to 1100° C., preferably in the range from 850° C. to 1000° C. This has the advantage that the hot direct reduced iron acts as a catalyst in the Bosch reaction. In the cooling zone the cooling gas in the presence of the direct reduced iron as catalyst undergoes the Bosch reaction with the result that carbon is deposited on the direct reduced iron. The deposited carbon then reacts with the iron of the direct reduced iron to form Fe3C (cementite). In particular, the deposited carbon diffuses into the interior of the iron and then reacts with the iron of the direct reduced iron to form Fe3C. This increases the carbon content of the direct reduced iron.

The Bosch reaction is an exothermic reaction which liberates energy. It has therefore been hitherto been assumed that the use of this reaction in a cooling zone is paradoxical. However, it has been found that, surprisingly, the subsequent formation of Fe3C at the surface of the direct reduced iron consumes a similar amount of energy, thus resulting in partial compensation. This partially offsets the effects on the cooling effect. In some applications it may even be advantageous when an energy excess remains since the desired end product is a hot direct reduced iron which is then subjected to further processing.

It is preferable when the carbon content of the direct reduced iron after carburizing is greater than 0.5% by weight, in particular greater than 1.5% by weight, preferably greater than 2.0% by weight. The carbon content of the direct reduced iron after carburizing is further less than 4.5% by weight, in particular less than 3.5% by weight, preferably less than 3.0% by weight. This has the advantage that the direct reduced iron may be sent to the known further processing operations without any need to adapt the further processing operations. In particular, the direct reduced iron may be subjected to further processing for example in the Linz-Donawitz converter (also referred to as a "Basic Oxygen Furnace"). In addition, the melting point of the direct reduced iron is lower due to the increased carbon content. Therefore, the energy demand for melting in the electric arc furnace is reduced.

The described process is particularly significant in an embodiment where the reduction gas in the reduction zone contains more than 75 mol % of H2, preferably more than 85 mol % of H2, in particular more than 90 mol % of H2. In a preferred variant the reduction gas in the reduction zone comprises less than 5 mol % of hydrocarbons, in particular less than 2 mol % of hydrocarbons. The reduction of the iron ore is then based substantially on the reaction

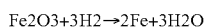

and no longer on the reaction

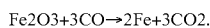

The use of H2 as the reducing agent in the iron ore thus has the advantage that the byproduct produced in addition to the direct reduced iron is substantially H2O (water vapor). In classical processes where the reducing agent employed is CO (carbon monoxide) produced from hydrocarbons (for example methane) CO2 is always produced as a byproduct. The use of H2 as a reducing agent therefore reduces the consumption of fossil fuels and simultaneously reduces emissions of the greenhouse gas CO2.

However, the use of H2 instead of CO as the reducing agent has the result that the carbon content of the direct reduced iron produced is generally particularly low, since no side reactions with hydrocarbons that would deposit carbon in the direct reduced iron can occur in the reduction zone. In particular the carbon content of the direct reduced iron after the reduction and before the carburizing is less than 1.0% by weight, especially less than 0.5% by weight, preferably less than 0.25% by weight.

The invention further relates to a cooling gas for use in a process as described hereinabove. The cooling gas comprises H2 and CO2, wherein the ratio of the mole fractions of H2 to CO2 is greater than 1.8 and the mole fraction of CO2 is greater than 20 mol %. The yield of the reaction is particularly good when the ratio of the mole fractions of H2 to CO2 in the cooling gas is greater than 1.8, preferably greater than 1.9. The ratio is especially less than 2.2, preferably less than 2.1. In a particularly preferred variant, the ratio of the mole fractions is equal to 2. Furthermore, the mole fraction of CO2 in the cooling gas is preferably greater than 20 mol %, in particular greater than 25 mol %, particularly preferably greater than 30 mol %. The mole fraction of CO2 is especially less than 40 mol %, preferably less than 35 mol %. In a preferred embodiment of the process the cooling gas comprises less than 5 mol % of hydrocarbons, in particular less than 2 mol % of hydrocarbons. The cooling gas has the same advantages as described hereinabove with respect to the process.

In a special variant of the process the reduction zone is arranged above the cooling zone in a shaft furnace. The iron ore then passes through the shaft furnace in a vertical direction from top to bottom. Such shaft furnaces make it possible to subject the iron ore to a good flow of cooling gas and reduction gas on account of the underlying chimney effect. In particular the cooling gas flows through the cooling zone counter to a direction of motion of the iron ore. Accordingly, the reduction gas likewise flows through the reduction zone counter to a direction of motion of the direct reduced iron produced. Accordingly, both the cooling zone and the reaction zone are run in countercurrent to achieve efficient reaction between the gases and the solids.

In another variant the reduction zone and/or the cooling zone comprise one or more fluidized bed reactors. In a fluidized bed reactor, a small-particle-size solids bed is fluidized via the gas which is continuously introduced from below via a gas distributor. This likewise enables efficient reaction between the gases and the solids.

The invention is more particularly elucidated with reference to the following exemplary embodiments in conjunction with the figures. In the figures:

FIG. 2 shows a schematic representation of a cascade of fluidized bed reactors.

Figure 1:
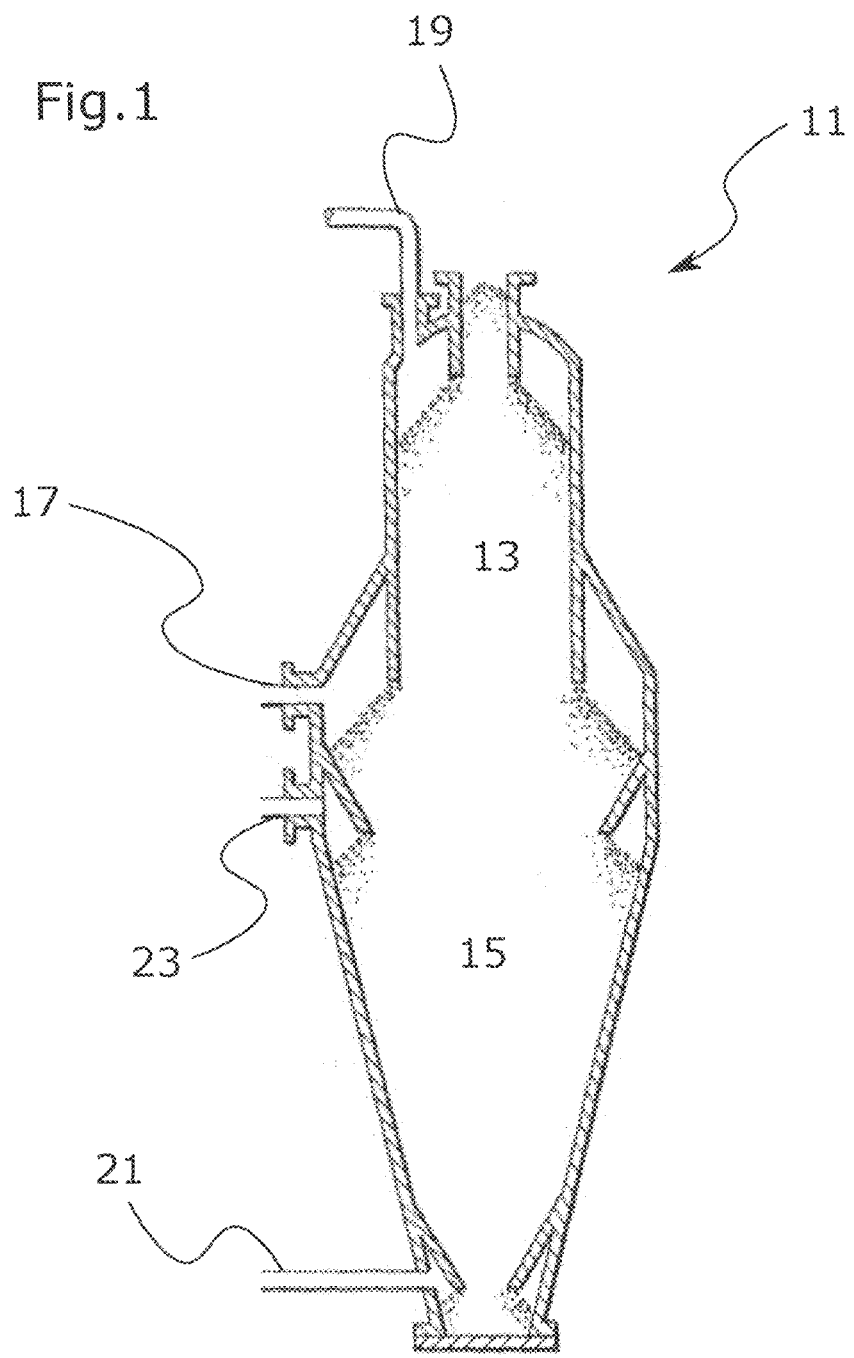
FIG. 1 shows a schematic representation of a shaft furnace.

FIG. 1 shows the schematic representation of a shaft furnace 11. Arranged in the shaft furnace 11 are a reduction zone 13 and a cooling zone 15. The reduction zone 13 is arranged above the cooling zone 15. The shaft furnace 11 is filled with iron ore from above. The direct reduced iron produced can be removed at the lower end of the shaft furnace 11. Reduction gas is simultaneously introduced into the shaft furnace 11 via the inlet 17. The reduction gas then flows through the iron ore in the reduction zone 13. In this variant the reduction gas is preheated to a temperature of up to 1100° C. but at least 800° C. The reduction gas may alternatively also be partially combusted in the shaft furnace 11 to produce the required temperatures for the reaction. In such a case oxygen is often added to the reaction gas to promote combustion. Unconsumed reduction gas, together with any gaseous reaction products, exits the furnace again at outlet 19. The reduction gas thus flows through the reduction zone 13 counter to a direction of motion of the iron ore. The reduction gas in the reduction zone 15 contains a high hydrogen content such that the reduction of the iron ore to afford direct reduced iron is based substantially on the reaction

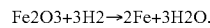

$$Fe_2O_3 + 3H_2 \rightarrow 2Fe + 3H_2O.$$

Due to the high hydrogen content and the low carbon content in the reduction gas the direct reduced iron exits the reduction zone 13 with a very low carbon content of less than 0.25% by weight. After exiting the reduction zone 13 the direct reduced iron enters the cooling zone 15. The direct reduced iron has a temperature in the range from 850° C. to 1000° C. In the cooling zone 15 the direct reduced iron in the cooling gas is subjected to a flow counter to the direction of motion of the direct reduced iron. To this end, the cooling gas enters the shaft furnace 11 through the inlet 21. Unconsumed cooling gas, together with any gaseous reaction products, exits the furnace again at outlet 23. It will be appreciated that a certain proportion of the cooling gas can also enter the reduction zone 13. A certain proportion of the reduction gas can likewise enter the cooling zone 15. Mixtures of cooling gas and reduction gas can therefore occur at the transition between the reduction zone 13 and the cooling zone 15. The cooling gas in the cooling zone 15 comprises H2 and CO2. The mole fraction of CO2 is 30 mol % and the mole fraction of H2 is 60 mol %. The hydrocarbon content of the cooling gas is less than 1 mol %. The cooling gas has a temperature of up to 400° C. upon entering the cooling zone. However, depending on the desired cooling effect, it is also possible to establish a lower temperature down to room temperature (20° C.). In the cooling zone the cooling gas undergoes the Bosch reaction in the presence of the hot direct reduced iron as catalyst. Hydrogen and CO2 in the cooling gas thus react according to the reaction

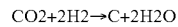

$$CO_2 + 2H_2 \rightarrow C + 2H_2O$$

to afford water vapor and carbon, wherein the carbon is deposited on the direct reduced iron serving as catalyst. The deposited carbon then diffuses into the interior of the direct reduced iron and forms Fe3C. This effect increases the carbon content of the direct reduced iron to 1.5% by weight to 3.5% by weight. The direct reduced iron carburized and cooled in this way may be removed in the lower region of the shaft furnace 11 and subjected to further processing in the known manner for steel production.

FIG. 2 shows a schematic representation of a cascade 25 of fluidized bed reactors 27a, 27b, 27c and 27d. The fluidized bed reactors 27a, 27b and 27c form the reduction zone 13 and the fluidized bed reactor 27d forms the cooling zone 15. The iron ore passes through the fluidized bed reactors 27a, 27b and 27c successively and is gradually converted into direct reduced iron. The arrows 29 indicate the material direction of the solids. The conversion of iron ore to direct reduced iron is effected in similar fashion when the iron ore in the respective fluidized bed reactor is subjected to a flow of the reduction gas from below. Reduction gas is introduced through inlet 17 and flows successively through the cascade of fluidized bed reactors in the sequence 27c, 27b, 27a. In this variant the reduction gas is preheated to a temperature of 1100° C. Unconsumed reduction gas, together with any gaseous reaction products, exits the furnace again at outlet 19. The reduction gas in the reduction zone 15 contains a high hydrogen content such that the reduction of the iron ore to afford direct reduced iron is based substantially on the reaction $$Fe_2O_3 + 3 \cdot H_2 \rightarrow 2Fe + 3H_2O.$$

Due to the high hydrogen content and the low carbon content in the reduction gas the direct reduced iron exits the fluidized bed reactor 27c and thus the reduction zone 13 with a very low carbon content of less than 0.25% by weight. After exiting the reduction zone 13 the direct reduced iron enters the cooling zone 15 in the form of fluidized bed reactor 27d. The direct reduced iron has a temperature in the range from 850° C. to 1100° C. In the fluidized bed reactor 27d the direct reduced iron is subjected to a flow of the cooling gas which enters the fluidized bed reactor 27d via the inlet 21. Unconsumed cooling gas, together with any gaseous reaction products, exits the furnace again at outlet 23. The cooling gas in the cooling zone 15 comprises $H_2$ and $CO_2$. The mole fraction of $CO_2$ is 30 mol % and the mole fraction of $H_2$ is 60 mol %. The hydrocarbon content of the cooling gas is less than 1 mol %. The cooling gas has a temperature of up to 400° C. upon entering the cooling zone. In the cooling zone the cooling gas undergoes the Bosch reaction in the presence of the hot direct reduced iron as catalyst. Hydrogen and $CO_2$ in the cooling gas thus react according to the reaction $$CO_2 + 2H_2 \rightarrow C + 2H_2O$$

to afford water vapor and carbon, wherein the carbon is deposited on the direct reduced iron serving as catalyst. The deposited carbon then diffuses into the interior of the direct reduced iron and forms $Fe_3C$. This effect increases the carbon content of the direct reduced iron to 1.5% by weight to 3.5% by weight. The direct reduced iron carburized and cooled in this way may be removed from the fluidized bed reactor 27d and subjected to further processing in the known manner for steel production.

A cascade of three fluidized bed reactors 27a, 27b, 27c for the reduction and one fluidized bed reactor 27d for the cooling and carburizing was elucidated here by way of example. It will be appreciated that depending on the application a different number of fluidized bed reactors may be connected to form a cascade for reduction or cooling and carburizing.

The invention claimed is:

1. A process for direct reduction of iron ore to afford direct reduced iron, wherein the iron ore sequentially passes through a reduction zone for reducing the iron ore to direct reduced iron and a cooling zone for cooling the direct reduced iron, wherein in the reduction zone the iron ore is subjected to a flow of a reduction gas and wherein in the cooling zone the direct reduced iron is subjected to a flow of a cooling gas, wherein the cooling gas in the cooling zone comprises $H_2$ and $CO_2$, wherein the ratio of the mole fractions of $H_2$ to $CO_2$ is greater than 1.8 and less than 2.2 and the mole fraction of $CO_2$ is greater than 20 mol %.

2. The process as claimed in claim 1, wherein the cooling gas in the cooling zone comprises less than 5 mol % of hydrocarbons.

3. The process as claimed in claim 2 wherein upon entering the cooling zone the direct reduced iron has a temperature in the range from 400° C. to 1100° C.

4. The process as claimed in claim 3 wherein in the cooling zone the cooling gas in the presence of the direct reduced iron as catalyst undergoes a Bosch reaction with the result that carbon is deposited on the direct reduced iron.

5. The process as claimed in claim 4, wherein the deposited carbon reacts with the iron of the direct reduced iron to form $Fe_3C$.

6. The process as claimed in claim 5 wherein the carbon content of the cooled direct reduced iron is in the range from 0.5% by weight to 4.5% by weight.

7. The process as claimed in claim 6 wherein the reduction zone is arranged above the cooling zone in a shaft furnace and the iron ore passes through the shaft furnace in a vertical direction.

8. The process as claimed in claim 7, wherein the cooling gas flows through the cooling zone counter to a direction of motion of the iron ore.

9. The process as claimed in claim 6 wherein the reduction zone comprises one or more fluidized bed reactors and the cooling zone (15) comprises one or more fluidized bed reactors.

10. The process as claimed in claim 9 wherein the reduction gas in the reduction zone contains more than 75 mol % of $H_2$.

11. The process as claimed in claim 9 wherein the reduction gas in the reduction zone contains more than 85 mol % of $H_2$.

12. The process as claimed in claim 11 wherein the reduction gas in the reduction zone comprises less than 5 mol % of hydrocarbons.

13. The process as claimed in claim 11 wherein the reduction gas in the reduction zone comprises less than 2 mol % of hydrocarbons.

14. The process as claimed in claim 1, wherein the cooling gas in the cooling zone comprises less than 2 mol % of hydrocarbons.

* * * * *